United States Patent [19]

Arima

[11] Patent Number: 5,162,090
[45] Date of Patent: Nov. 10, 1992

[54] METHOD OF MOLDING TUBULAR PARTS AND APPARATUS FOR PRACTICING THE SAME

[75] Inventor: Hidetoshi Arima, Aichi, Japan

[73] Assignee: Tokai Kogyo Kabushiki Kaisha, Aichi, Japan

[21] Appl. No.: 750,983

[22] Filed: Aug. 28, 1991

[30] Foreign Application Priority Data

Aug. 29, 1990 [JP] Japan .................................. 227120

[51] Int. Cl.⁵ .......................................... B29C 47/22
[52] U.S. Cl. ............................. 264/167; 264/177.16; 264/209.2; 425/381; 425/465; 425/467
[58] Field of Search ............... 264/167, 177.16, 209.2, 264/177.17, 177.19; 425/381, 465, 466, 467

[56] References Cited

U.S. PATENT DOCUMENTS

| | | | |
|---|---|---|---|
| 3,346,918 | 10/1967 | Deleuze et al. | 425/465 |
| 4,531,326 | 7/1985 | Ballocca et al. | 425/466 |
| 4,576,773 | 3/1986 | Azzola et al. | 264/177.16 |
| 4,619,077 | 10/1986 | Azolla et al. | 49/497 |
| 4,765,936 | 8/1988 | Ballocca | 264/177.16 |
| 4,960,375 | 10/1990 | Saito et al. | 264/177.16 |

FOREIGN PATENT DOCUMENTS

| | | | |
|---|---|---|---|
| 2617123 | 10/1977 | Fed. Rep. of Germany | 264/167 |
| 3414444 | 10/1985 | Fed. Rep. of Germany | 425/466 |
| 2310201 | 1/1977 | France | 425/466 |
| 62-121030 | 6/1987 | Japan . | |
| 1-242225 | 9/1989 | Japan . | |
| 1-242226 | 9/1989 | Japan | 425/466 |
| 889452 | 12/1981 | U.S.S.R. | 425/465 |

*Primary Examiner*—Jeffery Thurlow
*Attorney, Agent, or Firm*—Wenderoth, Lind & Ponack

[57] ABSTRACT

A method of and apparatus for molding a tubular part consisting of two lengthwise continuous portions of different cross-sectional shapes. The method involves extending or retracting a movable die of the apparatus with respect to an extrusion molding port thereof, which is formed by inserting a core in a non-projecting state in an extrusion opening in a die body, so as to regulate an extrusion rate by discharging a part of a raw molding material, and extruding the molding material while controlling the cross-sectional shape of the outer circumferential surface of the material being extruded, by a molding surface at the front end of the movable die, whereby the crosssectional shapes of the inner and outer circumferential surfaces of the material being extruded are varied.

12 Claims, 11 Drawing Sheets

METHOD OF MOLDING TUBULAR PARTS AND APPARATUS FOR PRACTICING THE SAME

FIELD OF THE INVENTION

This invention relates to a method of molding a tubular part consisting of two lengthwise continuous portions of different cross-sectional shapes, and an apparatus for practicing the method.

PRIOR ART

The known methods of molding a tubular part consisting of two lengthwise continuous portions of different cross-sectional shapes include a method illustrated in FIGS. 17 and 18.

In order to mold a portion of a larger cross-sectional area according to this method, a movable die 42 is retracted with respect to a smaller-diameter portion 41b of a stepped core 41 as shown in FIG. 17, and a raw molding material B is extruded from a hollow between a larger-diameter portion 41a of the stepped core 41 and a die 43. In order to mold a portion of a smaller cross-sectional area, the movable die 42 is extended toward the smaller-diameter portion 41b of the stepped core 41 as shown in FIG. 18, and a raw molding material B is extruded from a hollow between the smaller-diameter portion 41b of the stepped core 41 and the movable die 42 to carry out the molding of the material B.

Since the stepped core 41 and movable die 42 are thus disposed in an opposed state, the raw molding material B receives a back pressure, the level of which corresponds to the thickness of the stepped core 41, when the raw molding material B is extruded from the hollow between the stepped core 41 and movable die 42. Consequently, when the raw material B is molded with the movable die 42 extended toward the stepped core 41, the thickness of a molded product becomes small as compared with that of a molded product obtained when the raw material B is molded with the movable die 42 retracted, and, therefore, the thicknesses of two portions of different cross-sectional shapes of the molded product cannot be controlled to be uniform. Moreover, the cross-sectional shape of the inner circumferential surface of the portion having a smaller cross-sectional area is determined uniquely by the shape of the smaller-diameter portion 41b of the stepped core 41b.

An object of the present invention is to enable the cross-sectional shape of the portion of a tubular part which has a smaller cross-sectional area to be varied arbitrarily by disposing a movable die and a core so as not to be opposed to each other. Another object of the present invention is to enable the wall thickness as well of the portion of a tubular part which has a smaller cross-sectional area to be varied by varying an extrusion rate of a raw molding material non-proportionally to the variation of the cross-sectional area of the mentioned portion of the tubular part.

SUMMARY OF THE INVENTION

The method of molding tubular parts according to the present invention is adapted to mold a tubular part consisting of two lengthwise continuous portions of different cross-sectional shapes. A molding apparatus consisting of a die body provided with an opening for extruding a raw molding material therefrom and a raw material discharge passage joined to a raw material flow passage is used. A core is inserted in a non-outwardly-projecting state in the extrusion opening in the die body so as to form an extrusion molding port. A movable die has a front end surface constituting a molding surface, which is fixed to the front end surface of the die body so that the movable die can be extended or retracted with respect to the extrusion molding port. The method is characterized in that a part of the raw molding material is discharged with the raw molding material discharge passage in the die body closed or opened by extending or retracting the movable die with respect to the extrusion molding port. The extrusion rate of the raw material is thereby regulated. The raw molding material is extruded with the cross-sectional shape of the outer circumferential surface thereof controlled by the molding surface at the front end of the movable die, whereby the cross-sectional shapes of the inner and outer circumferential surfaces of the molding material are varied.

Since the movable die and core are disposed in a non-opposed state, the cross-sectional shape of the portion of a tubular part which has a smaller cross-sectional area can be varied by varying the position in which the movable die is extended into the extrusion molding port. If the extrusion rate of the raw molding material is varied non-proportionally to the variation of the cross-sectional area of the tubular part, the wall thickness of the portion of the tubular member which has a smaller cross-sectional area can be varied.

BRIEF DESCRIPTION OF THE DRAWINGS

FIGS. 1-9 illustrate a first embodiment of the present invention, wherein:

FIG. 1 is a perspective view showing the condition of molding a first tubular part $A_1$;

FIG. 2 is a front elevation showing the condition of molding the first tubular part $A_1$;

FIG. 3 is a sectional view taken along the line $X_1$—$X_1$ in FIG. 2;

FIG. 4 is a perspective view showing the condition of molding a second tubular part $A_2$;

FIG. 5 is a front elevation showing the condition of molding the second tubular part $A_2$;

FIG. 6 is a sectional view taken along the line $X_2$—$X_2$ in FIG. 5;

FIG. 7 is a rear perspective view of a movable die 8;

FIG. 8 is a sectional view of the first and second tubular parts $A_1$, $A_2$; and FIG. 9 is a sectional view of the first and second tubular parts $A_1$, $A_2'$.

FIGS. 10-16 illustrate a second embodiment of the present invention, wherein:

FIG. 10 is a sectional view of a first door seal $S_1$;

FIG. 11 is a sectional view of a second door seal $S_2$;

FIG. 12 is a front elevation of a molding apparatus for the door seals $S_1$, $S_2$;

FIG. 13 is a front elevation of the apparatus in an operation for molding the first door seal $S_1$;

FIG. 14 is a front elevation of the apparatus in an operation for molding the second door seal $S_2$;

FIG. 15 is a sectional view taken along the line $Y_1$—$Y_1$ in FIG. 13; and

FIG. 16 is a sectional view taken along the line $Y_2$—$Y_2$ in FIG. 14.

DETAILED DESCRIPTION OF THE PREFERRED EMBODIMENTS

The present invention will now be described more in detail on the basis of the embodiments thereof.

In the first embodiment of the present invention shown in FIGS. 1-9, a first tubular part $A_1$ having a cylindrical body and a second tubular part $A_2$ having a semi-cylindrical body are continuously extrusion molded.

Figure 1:
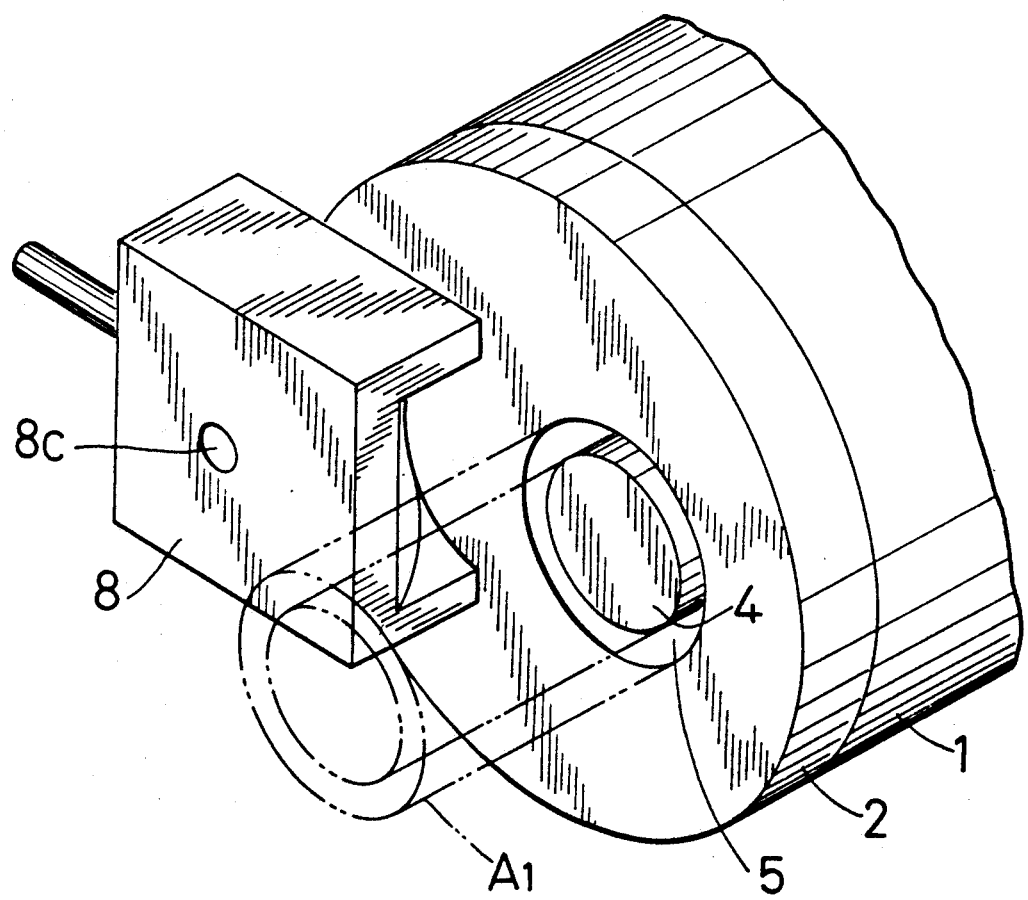
Figure 2:
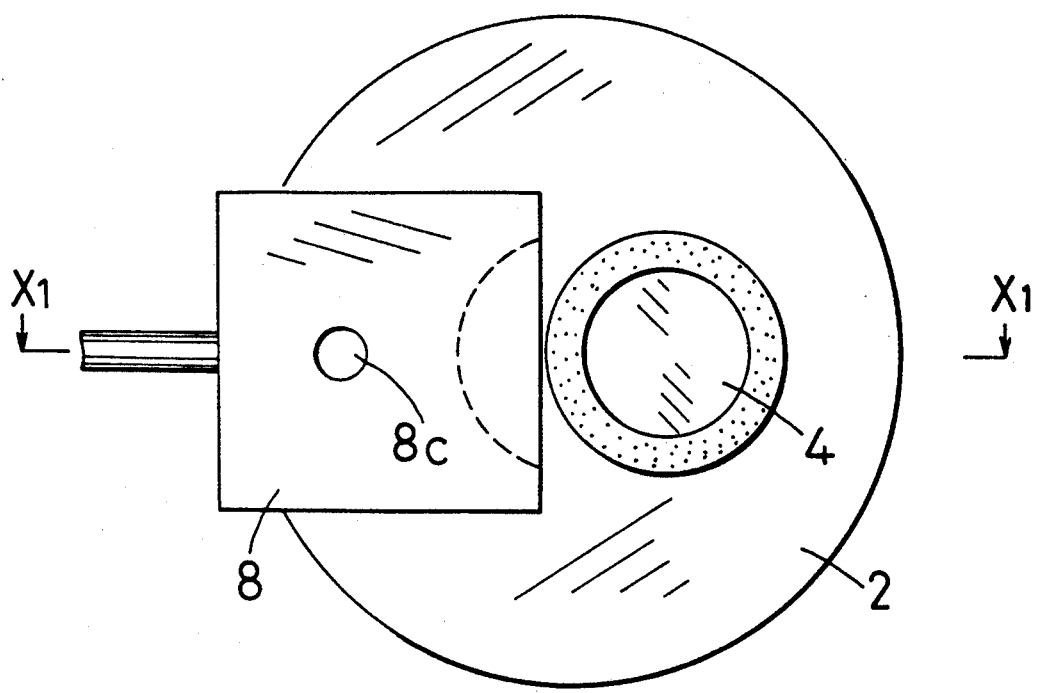
Figure 3:
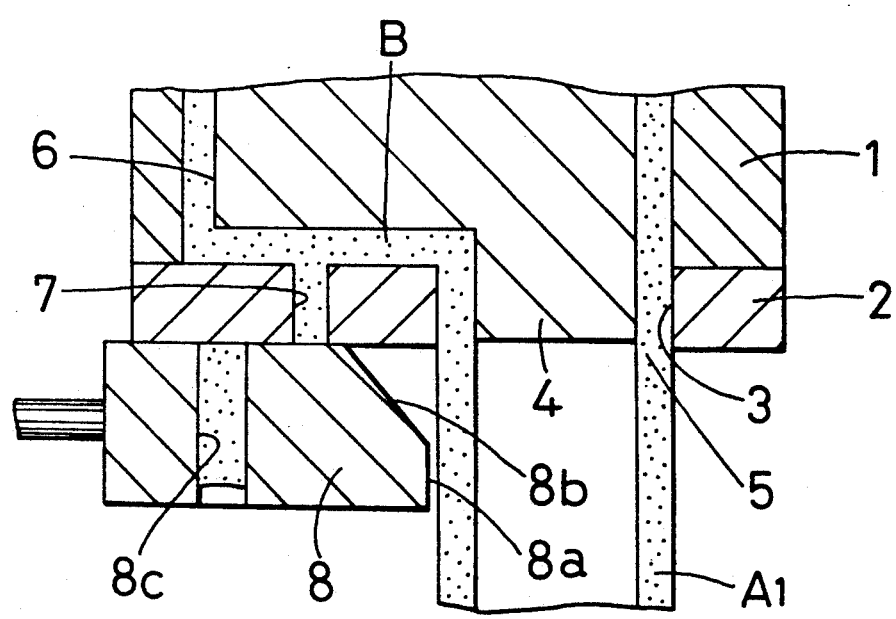

Referring to FIGS. 1-3, a mouthpiece 2 is attached to the front end portion of a die body 1, and a circular extrusion opening 3 (refer to FIG. 3) is formed in this mouthpiece 2. A cross-sectionally circular core 4 is inserted in this extrusion opening 3, whereby an extrusion molding port 5 is formed. The core 4 does not project from the front end surface of the mouthpiece 2. The die body 1 is provided therein with a flow passage for a raw molding material B, and a raw material discharge passage 7 formed in the mouthpiece 2 for discharging the raw molding material B therefrom is joined to the flow passage 6.

Figure 6:
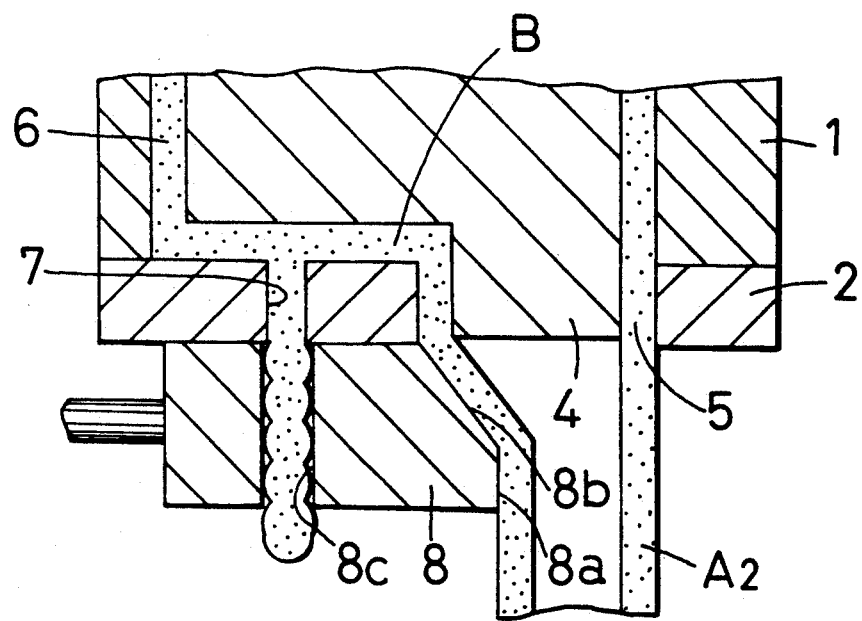
Figure 7:
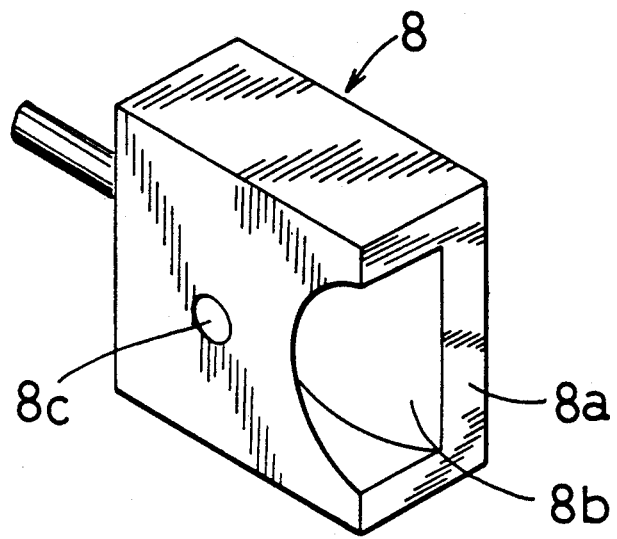

A movable die 8 is provided on the front surface of the die body 1 so that the movable die 8 can be extended or retracted with respect to the extrusion molding port 5. The front end surface of this movable die 8 constitutes a molding surface $8a$ for use in molding a portion of the outer circumferential surface of a second tubular part $A_2$ having a semi-cylindrical body, and a guide surface $8b$ is joined to the molding surface $8a$ (refer to FIG. 7). This movable die 8 is provided with a raw material discharge bore $8c$. When the movable die 8 is retracted, the raw material discharge passage 7 provided in the die body 1 is closed with the movable die 8 as shown in FIG. 3, and, when the movable die 8 is extended, the raw material discharge bore $8c$ made therein and the raw material discharge passage 7 communicate with each other as shown in FIG. 6.

Figure 4:
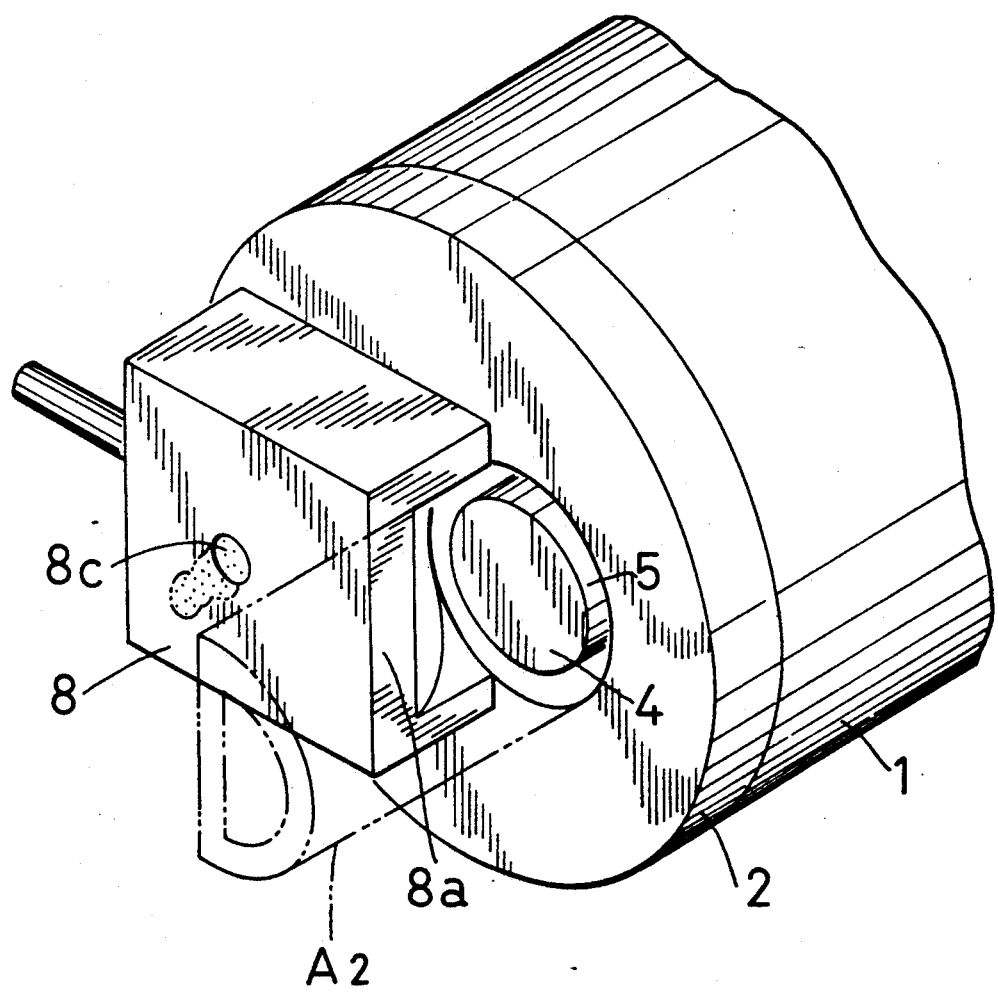
Figure 5:
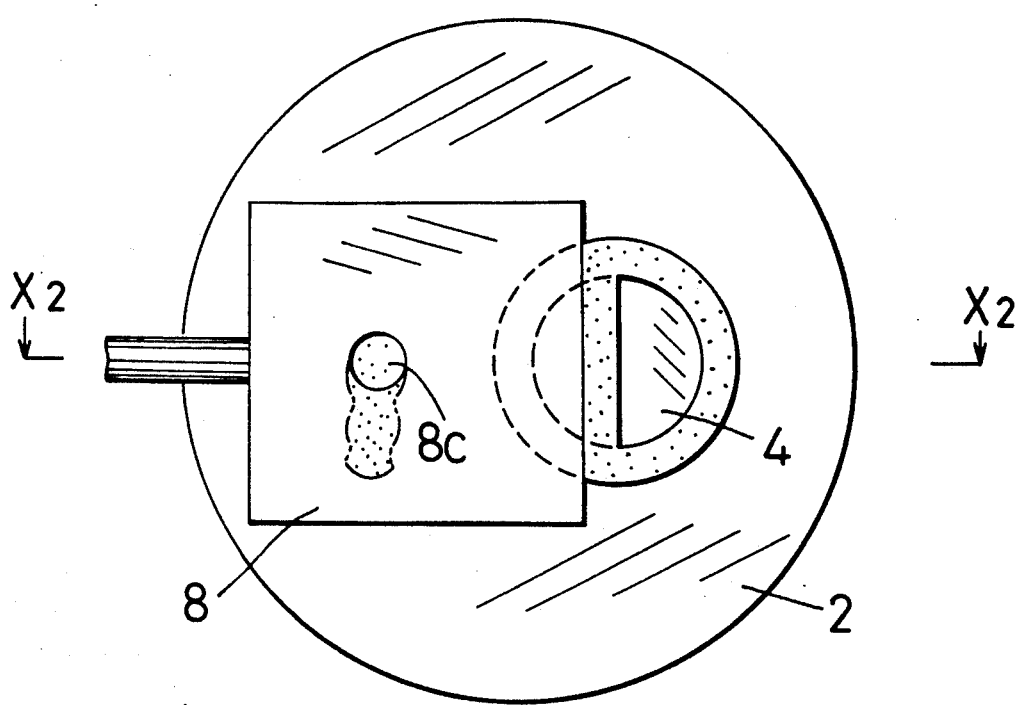

When the movable die 8 is retracted with respect to the extrusion molding port 5 so as to close the raw material discharge passage 7 formed in the mouthpiece 2 with the movable die 8 as shown in FIGS. 1-3, the whole of the raw molding material B is extruded from the extrusion molding port 5, so that a first tubular part $A_1$ having a cylindrical body is extrusion molded. When the movable die 8 is extended with respect to the extrusion molding port 5 so as to allow the raw material discharge passage 7 formed in the mouthpiece 2 to communicate with the raw material discharge bore $8c$ provided in the movable die 8, as shown in FIGS. 4-6, a part of the raw molding material B is discharged to the outside through the raw material discharge passage 7 and raw material discharge bore $8c$, and the remaining raw molding material B is extruded from the extrusion molding port 5. The flow passage for a portion of the tubular part extruded from the extrusion molding port 5 of the die body 1 is changed forcibly by the guide surface $8b$ extending to the molding surface $8a$ on the front end of the movable die 8, and a portion of the outer circumferential surface of the second tubular part $A_2$ having a semi-cylindrical body is molded by the molding surface $8a$. Since the movable die 8 and core 4 is not opposed to each other, the inner circumferential surface of the tubular part the raw material for which flows along the molding surface $8a$ of the movable die 8 is completely free from restrictions. Therefore, the raw molding material B does not receive a back pressure at the portion thereof which is opposed to the molding surface $8a$ of the movable die 8, and, when a ratio of the cross-sectional area of the first tubular part $A_1$ to that of the second tubular part $A_2$ and a ratio of the extrusion rate of the raw molding material during the extrusion of the tubular part $A_1$ to that of the raw molding material during the extrusion of the tubular material $A_2$ are equal, the wall thickness of these tubular parts $A_1$, $A_2$ becomes equal.

Figure 8:
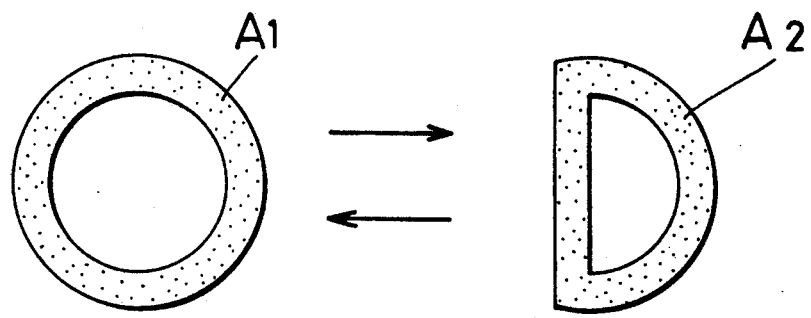
Figure 9:
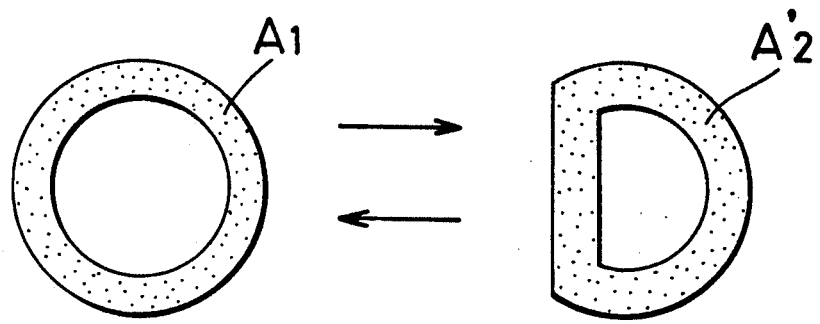
Figure 10:
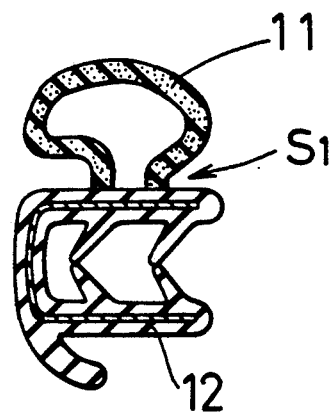
Figure 11:
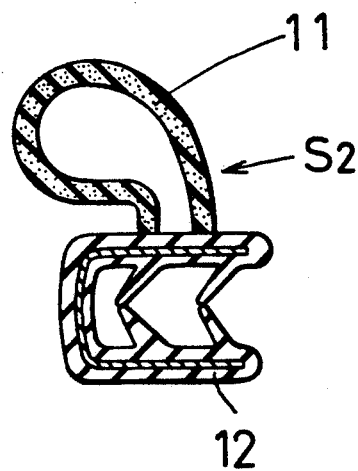

Accordingly, the first tubular part $A_1$ having a cylindrical body and second tubular part $A_2$ having a semi-cylindrical body, both of which have an equal wall thickness as shown in FIG. 8, can be continuously extrusion molded. If the quantity of extension of the movable die 8 with respect to the extrusion molding port 5 is regulated with the variation of extrusion rate of the raw molding material B with respect to that of the cross-sectional areas of the tubular parts $A_1$, $A_2$ set non-proportional (in the illustrated embodiments, the rate of variation of the cross-sectional areas of the tubular parts $A_1$, $A_2'$ is set higher than that of extrusion rates of the raw molding material B), for example, the first tubular part $A_1$ having a cylindrical body and the second tubular part $A_2'$, which have different wall thicknesses as shown in FIG. 9, can also be continuously molded. If the rate of extension of the movable die 8 with respect to the extrusion molding port 5 is regulated, tubular parts of various cross-sectional shapes can be molded. Also, if the variation of the extrusion rates of the raw molding material with respect to that of the cross-sectional areas of the tubular parts is set non-proportional, the wall thicknesses of the tubular parts can be rendered different.

In a second embodiment of the present invention shown in FIGS. 10-16, two door seals $S_1$, $S_2$ having tubular seal portions of largely different cross-sectional shapes are continuously extrusion molded. The tubular seal portions 11 are molded integrally with anchor portions 12.

Figure 12:
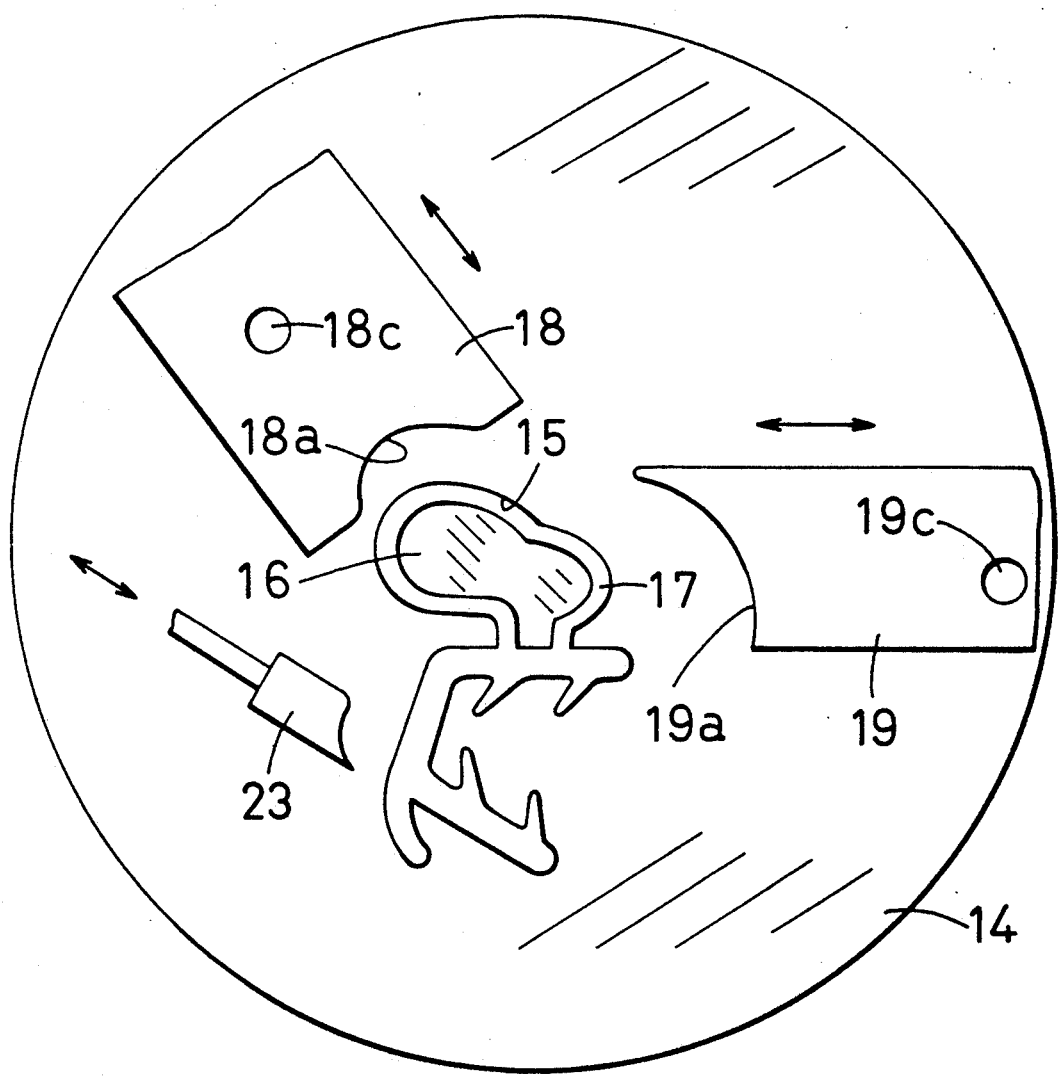
Figure 13:
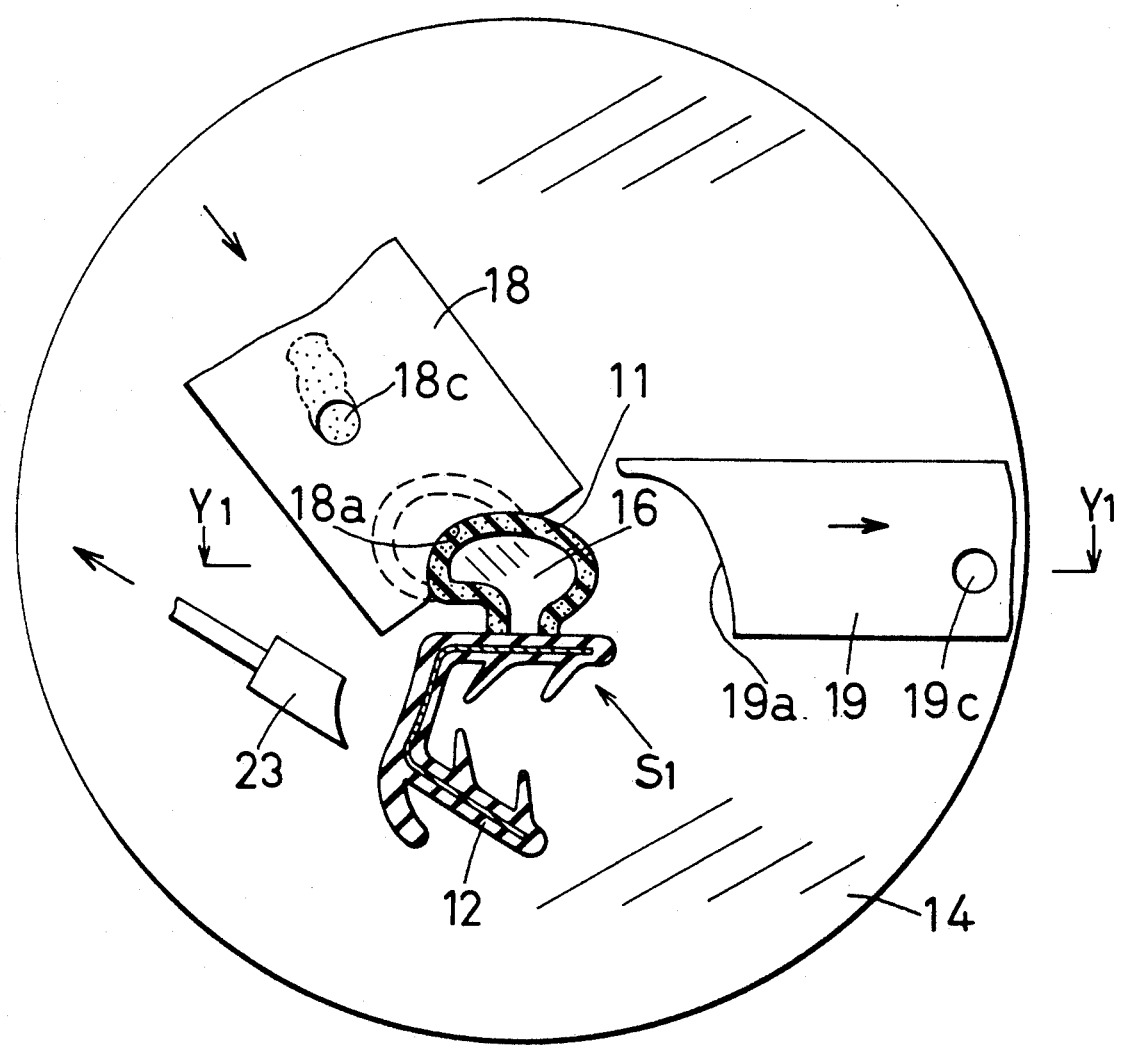
Figure 14:
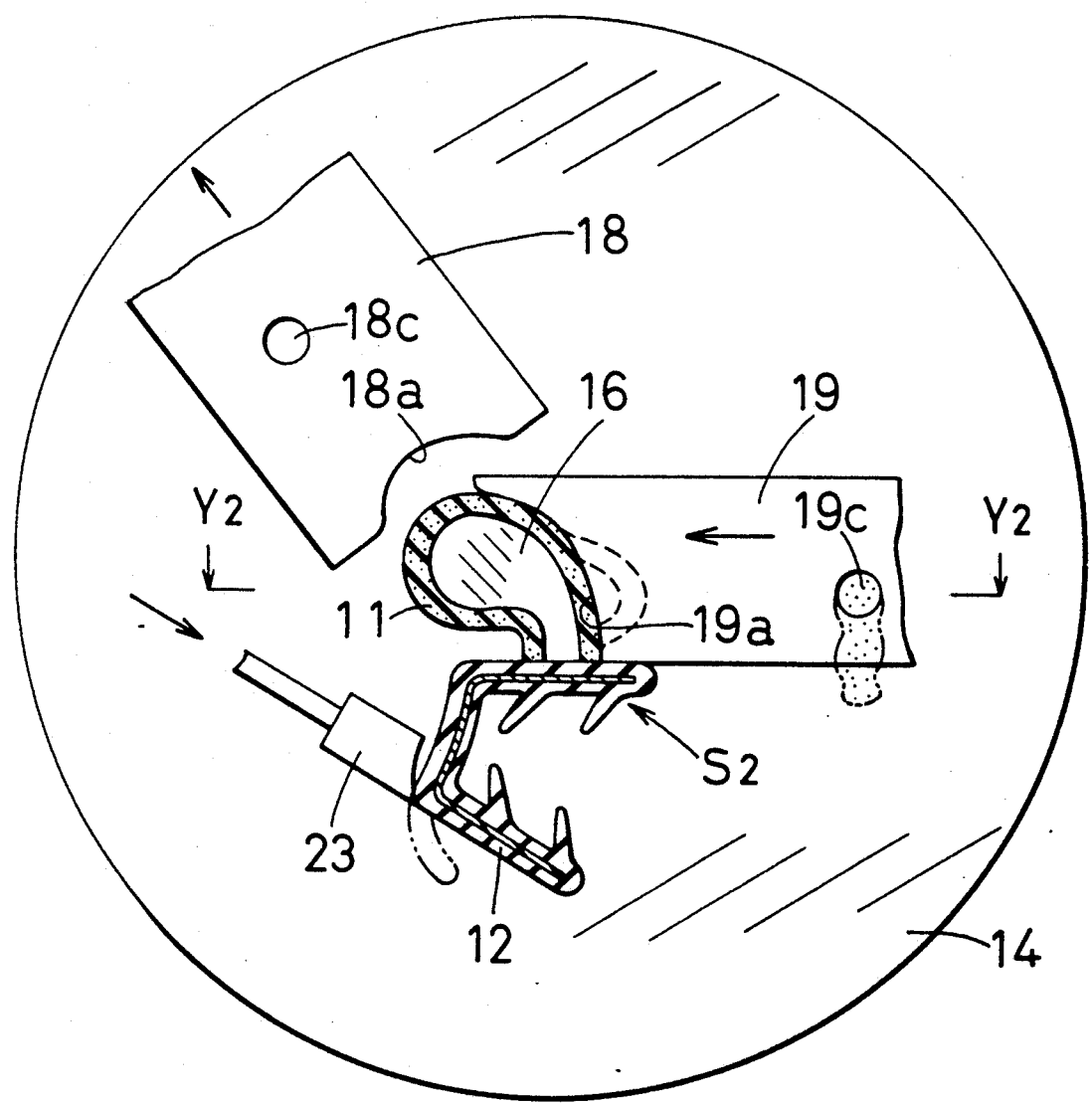
Figure 15:
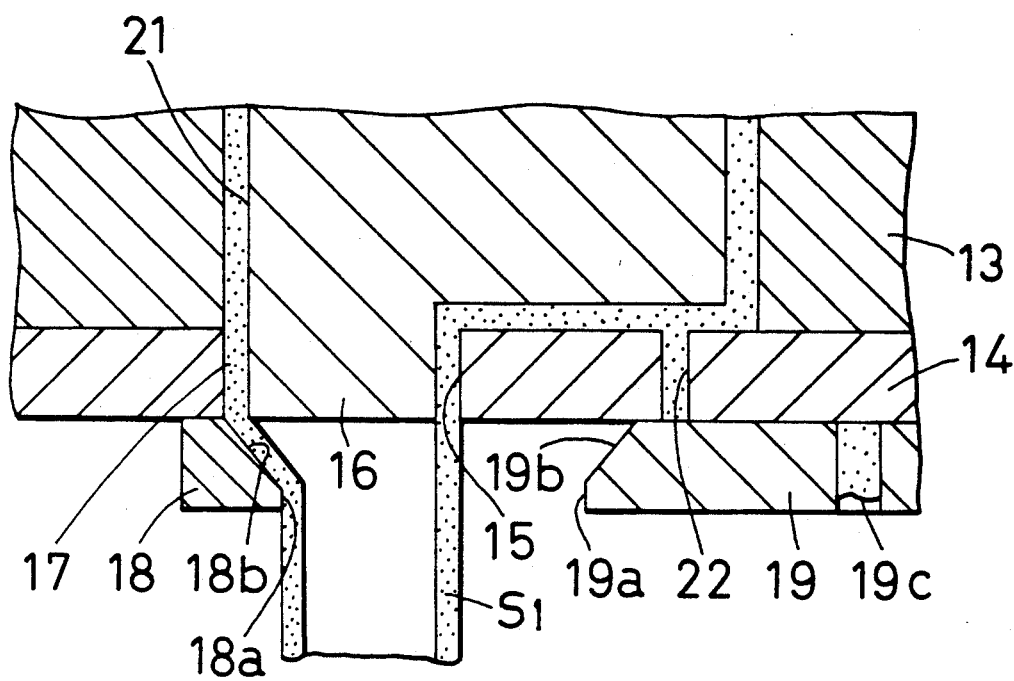

As shown in FIGS. 12 and 15, a mouthpiece 14 is attached to the front surface of a die body 13, and provided with an extrusion opening 15 the cross-sectional shape of which corresponds to those of door seals $S_1$, $S_2$. A core 16 is inserted in a non-projecting state in the extrusion opening 15 to form an extrusion molding port 17. The cross-sectional shape of the portion of the extrusion opening 15 through which the tubular seal portions are molded is in agreement with those combined of the tubular seal portions of the door seals $S_1$, $S_2$. First and second movable dies 18, 19 are provided on the front surface of the mouthpiece 14 so that these dies can be extended or retracted with respect to the extrusion molding port 17. The first and second movable dies 18, 19 are provided at their front ends with molding surfaces $18a$, $19a$ which are to be opposed to portions of the outer circumferential surfaces of the tubular seal portions 11 of the door seals $S_1$, $S_2$, these dies being also provided with guide surfaces $18b$, $19b$ extending to the molding surfaces $18a$, $19a$, as well as raw material discharge bores $18c$, $19c$. The die body 13 is provided with a flow passage for a raw molding material B, and the mouthpiece 2 with a raw material discharge passage 22 joined to the flow passage 21. Referring to FIGS. 12-14, a reference numeral 23 denotes a lip cutter.

Figure 16:
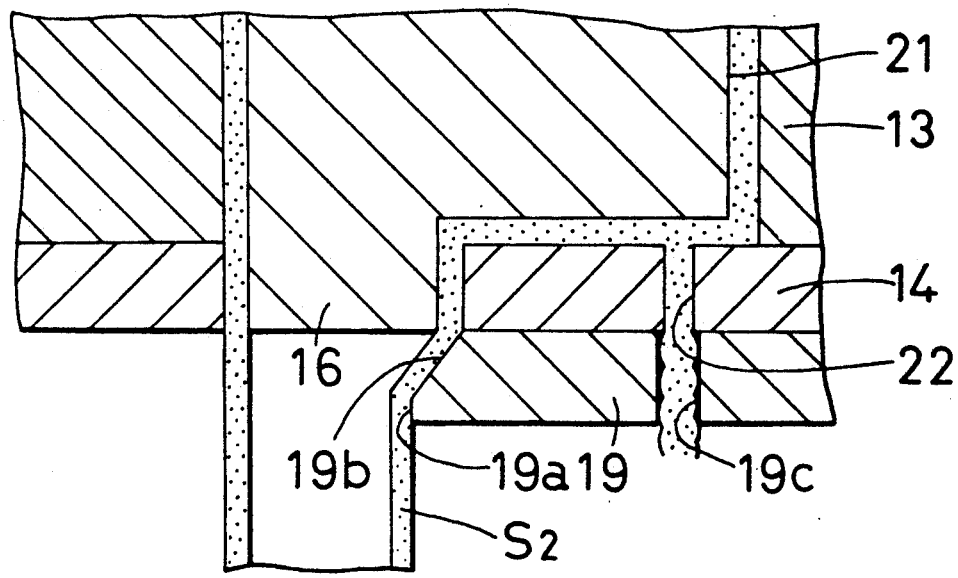
Figure 17:
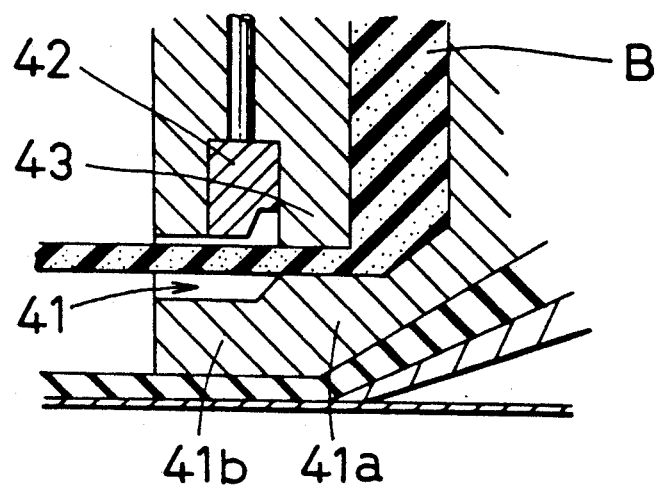
FIG. 17 is a sectional view of the condition of molding a portion of a larger cross-sectional area by a conventional molding apparatus.
Figure 18:
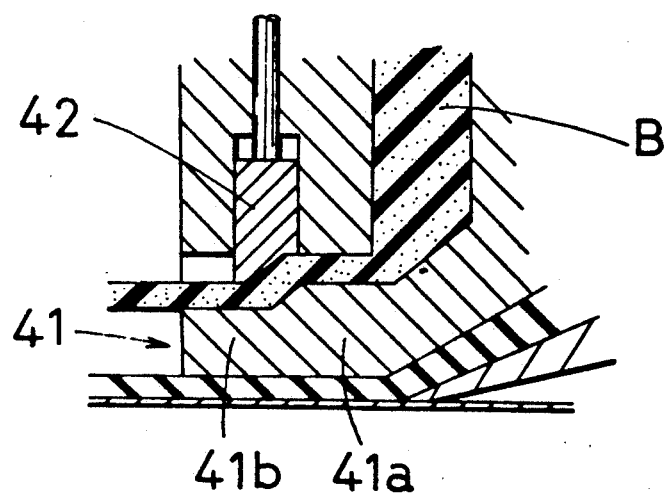
FIG. 18 is a sectional view of the condition of molding a portion of a smaller cross-sectional area by the conventional molding apparatus.

In order to mold the first door seal $S_1$, the first movable die 18 alone is extended toward the extrusion molding port 17 as shown in FIGS. 13 and 15, and a part of the raw molding material B is extruded along the molding surface $18a$ thereof. In order to mold the second door seal S₂, the second movable die 19 alone is extended toward the extrusion molding port 17 as shown in FIGS. 14 and 16, and a part of the raw molding material B is extruded along the molding surface 19a thereof. In both of the movable dies 18, 19, the raw molding material B is discharged from the raw material discharge bores 18c, 19c when these dies are extended toward the extrusion molding port, and these raw material discharge bores 18c, 19c are closed with the movable dies 18, 19 when these dies are retracted from the extrusion molding port.

Using these two movable dies 18, 19 in this manner enables tubular seal portions 11 having largely different cross-sectional shapes to be molded.

I claim:

1. An apparatus for molding tubular parts, comprising:
    a die body having an extrusion opening, a flow passage therein for raw molding material communicating with said extrusion opening and a raw material discharge passage communicating with said flow passage;
    a core inserted in said extrusion opening in said die body so as to form, together with said extrusion opening, an extrusion molding port; and
    a movable die having a front end surface defining a molding surface provided on said die body such that said moveable die can be extended and retracted with respect to said extrusion molding port and such that said moveable die forms a closure for said raw material discharge passage closing said raw material discharge passage upon retraction from said extrusion molding port and opening said raw material discharge passage upon extrusion toward said extrusion molding port.

2. The apparatus of claim 1, wherein said moveable die has a raw material discharge bore alignable with and opening said raw material discharge passage upon extension toward said extrusion molding port.

3. The apparatus of claim 1, wherein said die body has a front end portion with a mouthpiece attached thereto, said extrusion opening and said raw material discharge passage being formed in said mouthpiece.

4. The apparatus of claim 3, wherein said flow passage is defined between said core and said die body, said core protruding from said die body in said extrusion opening at most to the front end surface of said mouthpiece.

5. The apparatus of claim 1, wherein a second raw material discharge passage is provided in said die body and a second moveable die having a front end surface with a molding surface is provided on said die body such that said second moveable die can be extended and retracted with respect to said extrusion molding port and such that said second moveable die forms a closure for said second raw material discharge passage closing said second raw material discharge passage upon retraction from said extrusion molding port and opening said second raw material discharge passage upon extension toward said extrusion molding port.

6. The apparatus of claim 5, wherein both said moveable dies have a raw material discharge bore alignable with and opening their respective said raw material discharge passage upon extension toward said extrusion molding port.

7. The apparatus of claim 5, wherein said die body has a front end portion with a mouthpiece attached thereto, said extrusion opening and both said raw material discharge passages being formed in said mouthpiece.

8. The apparatus of claim 7, wherein said flow passage is defined between said core and said die body, said core protruding from said die body in said extrusion opening at most to the front end surface of said mouthpiece.

9. A method of molding a tubular part having two lengthwise continuous portions of different cross-sectional shapes, comprising the steps of:
    providing a die body having an extrusion opening with a core inserted in said extrusion opening so as to from an extrusion molding port and so that said core projects no further than the front surface of said die body and a moveable die having a molding surface at the front end thereof;
    extending a raw molding material through said extrusion molding port, around said core, to mold a tubular part;
    varying the cross-sectional shape of the tubular part extruded from said extrusion molding part by extending said moveable die toward said extrusion molding port such that said molding surface affects the molding of the cross-sectional shape of the tubular part or retracting said moveable die such that said molding surface does not affect the molding of the cross-sectional shape of the tubular part; and
    regulating the rate of extrusion of raw molding material from said extrusion molding port by discharging raw molding material when said moveable die is at an extended position whereat said molding surface affects the molding of the cross-sectional shape of the tubular part.

10. The method of claim 9, wherein said step of regulating comprises discharging the raw material from a flow passage in said die body through a raw material discharge passage opened when said moveable die is extended and closed when said moveable die is retracted.

11. The method of claim 10, wherein said moveable die has a raw material discharge bore alignable with said raw material discharge passage for opening and closing said raw material discharge passage.

12. The method of claim 9, and further comprising:
    providing a second moveable die having a molding surface at the front end thereof; and
    further varying the cross-sectional shape of the tubular part by extending said second moveable die toward said extrusion molding port when the first said moveable die is retracted from said extrusion molding port.

* * * * *